United States Patent [19]

Cerny et al.

[11] Patent Number: 4,730,482
[45] Date of Patent: Mar. 15, 1988

[54] PROCESS AND APPARATUS FOR MONITORING THE HERMETICITY OF FILLED CONTAINERS CLOSED BY SEALED-ON OR WELDED-ON COVER OF THE LIKE

[75] Inventors: Gerhard Cerny, Munich; Ewald G. Welp, Erkrath; Alois Gneithing; Fritz Neber, both of Schwaebisch-Hall, all of Fed. Rep. of Germany

[73] Assignee: Gasti Verpackungsmaschinen GmbH, Schwaebisch-Hall, France

[21] Appl. No.: 894,411

[22] Filed: Aug. 7, 1986

[30] Foreign Application Priority Data

Aug. 7, 1985 [DE] Fed. Rep. of Germany ....... 3528248

[51] Int. Cl.⁴ ............................................. G01M 3/36
[52] U.S. Cl. ......................................... 73/49.3; 73/52
[58] Field of Search ..................... 73/49.3, 52, 49.2; 374/4, 5

[56] References Cited

U.S. PATENT DOCUMENTS

| 2,512,910 | 6/1950 | Bell | 374/5 |
| 3,729,984 | 5/1973 | Waldherr | 73/52 |
| 4,326,408 | 4/1982 | Kanoh | 73/49.3 |

FOREIGN PATENT DOCUMENTS

| 2351400 | 5/1976 | France | 73/49.3 |
| 90026 | 5/1984 | Japan | 73/49.3 |

Primary Examiner—Stewart A. Levy
Assistant Examiner—Hezron E. Williams

[57] ABSTRACT

The invention relates to a process and an apparatus for monitoring the hermeticity of filled containers closed by sealed-on or welded-on covers, or the like. The air or gas cushion present between the cover and the material with which the container is filled, is heated, and the change caused in the position of the cover, by the resulting increase in the volume of air or gas, is monitored, after which the containers which have been indicated as having missing or faulty covers, are removed.

10 Claims, 3 Drawing Figures

PROCESS AND APPARATUS FOR MONITORING THE HERMETICITY OF FILLED CONTAINERS CLOSED BY SEALED-ON OR WELDED-ON COVER OF THE LIKE

FIELD OF THE INVENTION

The invention relates to a process and apparatus for monitoring the hermeticity of filled containers closed by a sealed-on or welded-on cover or the like.

DESCRIPTION OF THE PRIOR ART

A hermeticity monitoring system is known in practice which makes use of a vacuum chamber. A vacuum chamber of this kind, although suitable for laboratory use, is not suitable for monitoring the tightness of a filling machine by which a product is introduced into the container. Not only is there usually insufficient space for the installation of the vacuum chamber, and insufficient time for the required evacaution, but suitable facilities for accurate volumetric vacuum measurement are usually likewise lacking.

There is also known in the art of a testing apparatus containing scanning nails positioned circularly in accordance with the inner edge of the container and providing a means of scanning the sealed-on cover of the container taking the form of a plastic vessel. If one or more nails drop down they are absent from certain places on the cover. The known testing apparatus thus only enables the present of the cover to be ascertained but does not enable its hermeticity or that of the container to be verified.

The filling of foodstuffs into containers, however, such as yogurt, cream cheese, etc., is the particular field in which absolute tight sealing systems are essential, since otherwise the product becomes unfit for consumption.

SUMMARY OF THE INVENTION

The present invention is thus aimed specifically at resolving the problem of monitoring the hermeticity of filled containers with simple means. As per German Unexamd. Sppn. No. 34 30 082.1, the inventor's base their system on the principle that the layer of air or gas present between the cover and the product filled into the container should be heated up until, as a result of the increase of the volume of air or gas inside the already sealed container, the sealed-on or welded-on cover stretches like a drumskin. This stretching also occurs if in the case of gaseous products the container is pressed in at the sides, e.g. at the sealing station, in order to generate a vacuum in the container as soon as the pressure is removed. In the older application, the applicants also proceed on the principle that a faultless cover, i.e. one ensuring an absolutely tight sealing effect, will act like a stretched diaphragm, while a faulty cover, e.g. one having a hole, will act like a plate relieved of stresses, the diaphragm and the plate having different vibration characteristics. The cover sealed or welded onto the container will thus be caused to vibrate, its vibration characteristics then being measured. This enables a satisfactory and an unsatisfactory container to be distinguished without difficulty, so that the containers can be rapidly sorted and products of the highest quality can be obtained.

The object of the present invention is to propose a process by which the hermeticity of a container closed by a sealed-on or welded-on cover, particularly a plastic vessel, can be verified reliably by still simpler means.

The invention enables this object to be achieved as a result of the fact that the air cushion or gas cushion present between the cover to the like, and the material with which the container is filled is heated, and the change caused in the position of the cover, or the like, by the resulting increase in the volume of air or gas is scanned, while finally the scanning result is utilized for the indication of missing or faulty covers, or the like, and for their removal if necessary. The process to which the invention relates thus makes use of the difference between the behavior of a faultless cover and that of a faulty cover, i.e. the different position assumed by the cover in the vertical direction as a result of the change in the volume of air or gas is scanned and ascertained and the test result evaluated in such a manner, for example, that a code is sprayed onto the edge of the container or else an easily visible hole is punched in the faulty container, so that the unsatisfactory container or vessel or the carton can be removed. If necessary, the information on the fault can also be fed into a PC control system, so that the exact position of the faulty container or vessel is transmitted onwards via a slide register and the faulty container or vessel can be pushed over a side way onto a correction belt. The latter can be fitted with a stop device with a "committer"; a fault picture with a inversely flashing faulty vessel can be produced by a call-in process.

In a preferred embodiment of the invention, the cushion of air or gas present between the cover and the product with which the container has been filled, is heated through the cover. This enables the air or gas to be rapidly heated, an operation of considerable value in the case of a high-speed production plant.

It has also been found to be of advantage if the cover or the like, after heating and before the scanning and the indication of the test result, is temporarily subjected to pressure via its exterior. This accelerates the transmission of the heat and forces the air or gas through any openings present in the cover, so that if the latter is faulty it retains its position, whereas a fully satisfactory cover will move upwards as soon as the said pressure is removed.

To enable the process to be carried out, an apparatus is herein disclosed which is characterized by an adjusting unit with a heating device, a scanning device, and also a measuring indicator, in addition, if necessary, to a sorting device for the containers.

The heating device for each container or cover has a ram-like heating head mounted in guide bushings in such a way as to be axially movable in opposition to at least one pressure spring. The heating head or heads are preferably made of aluminium and having a heating cartridge with a thermo-element for temperature regulating purposes.

The contact surface, belonging to the heating head and capable of being placed on the cover, is arched or convex in order to adapt itself more satisfactorily to the movement of the cover when being mounted.

It has also been found to be of advantage if the contact surface of the heating head is provided with grooves, which should preferably be concentric and/or diagonal or transversal thereto. The purpose of this system of grooves is to ensure that when the heating head is pressed onto the cover, very small apertures will not be closed up, and that the air or the gases are still able to escape. Practical tests have shown that apertures underneath the raised surfaces of the heating head, i.e. between the grooves, are also detected. By apertures are meant, for example, a needle-size opening in the cover, very narrow channels in the weld, a crack in the wall of the cover or the actual absence of a cover. A contribution is made to the compactness and the simplicity of the entire monitoring system if the pressure spring acting on the heating head rests at one end on a clamping piece which can be secured on a guide bar of the heating head and at the other end on a pressure plate adjustable relatively to holding plates accommodating the guide bushings. The said plate can be connected with at least one pneumatic cylinder-piston unit which is connected via one or more adjusting bars with a frame bearing the holding plates. This provides a very simple means of supplying the additional pressure for the outside of the cover, so that the gas or air can rapidly escape from the internal space.

BRIEF DESCRIPTION OF THE DRAWINGS

These and other features of the invention will become apparent with reference to the drawings and the following detailed specification wherein.

DETAILED SPECIFICATION

Figure 1:
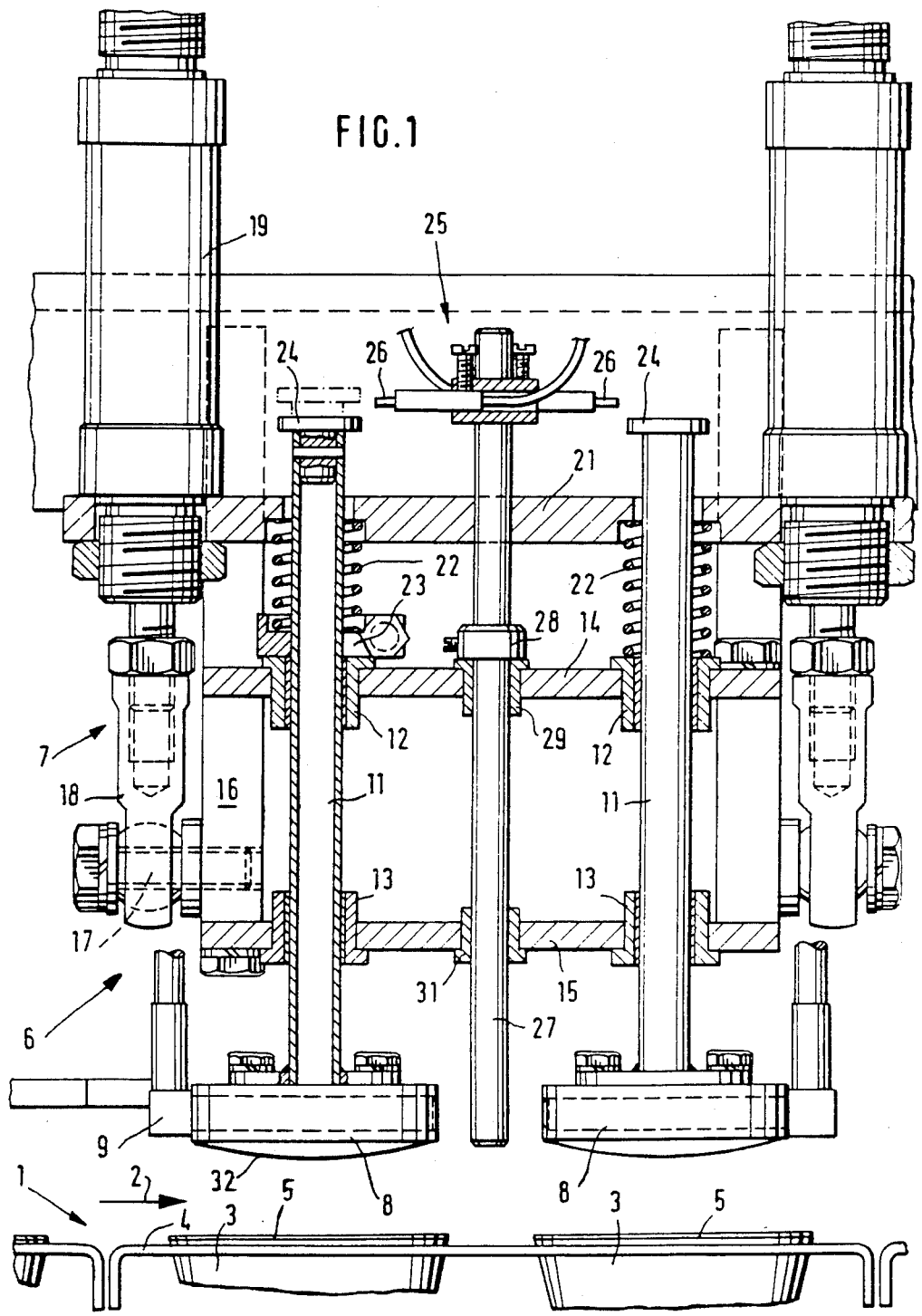
FIG. 1 is a schematic diagram of the monitoring apparatus with two heating heads.

As may be seen from FIG. 1, containers or vessels 3 can be conveyed along different working stations in the direction shown by the arrow 2 by means of a conveyor device 1 of a container filling and sealing machine not shown in detail. In the example illustrated there are in each case two containers 3 in a compartment 4 of the conveyor device 1. The containers 3 taking the form of plastic cups are closed by means of a cover 5 made of aluminium or a similar material.

Behind a sealing station belonging to the filling and sealing machine, not shown in the drawing, a monitoring device 6 is provided for the purpose of verifying the hermeticity of the containers 3. This monitoring device 6 has an adjusting unit 7 which is movable up and down in the vertical plane by means of a cam plate and a drive which are not shown in the drawing and which is provided with a heating device taking the form of a heating head 8 associated with each cup 3. As the two heating heads 8 are of identically similar construction, the description from now on will relate solely to the heating head 8 shown in the left hand part of the drawing. The heating head 8 consists of aluminium and accommodates a heating cartridge 9 with a thermo element for temperature regulating purposes. The heating head 8 is constructed like a ram and provided with a guide bar 11 mounted so as to be axially movable in guide bushings 12 and 13. The two guide bushings 12 and 13 rest in holding plates 14 and 15 made of aluminium and affixed to a frame 16. Adjusting bars 18, connected in their turn with a cylinder-piston unit 19, are affixed to the frames 16 by means of securing screws 17. The pneumatic-piston unit 19 is affixed to a pressure plate 21 adjustable in relation to the frame 16 and to the holding plates 14 and 15 via the said cylinder-piston unit 19. The adjustment is effected in opposition to the action of the pressure spring 22 which at one end rests against a clamping piece 23 which is shown in a position offset by 90° and which can be clamped to the guide bar 11 of the heating head 8. At the end farther away from the heating head 8, the guide bar 11 is provided with a plate 24 which interacts with a scanning device 25. The scanning device has an optical measuring device 26 which takes the form, for example, of an optical fiber system, by means of which the height differences of the plate 24 can be observed with an accuracy of one tenth of a millimeter. The scanning device 25 is affixed to a vertical spacer rod 27 which can be adjusted via a securing ring 28 in relation to the compartment 4 bearing the vessels 3, so that the measuring process described below always take place at the same vertical distance, even in the event of a curved cup compartment 4. The vertical spacer rod is displaceably mounted in bushing 29 and 31.

Figure 2:
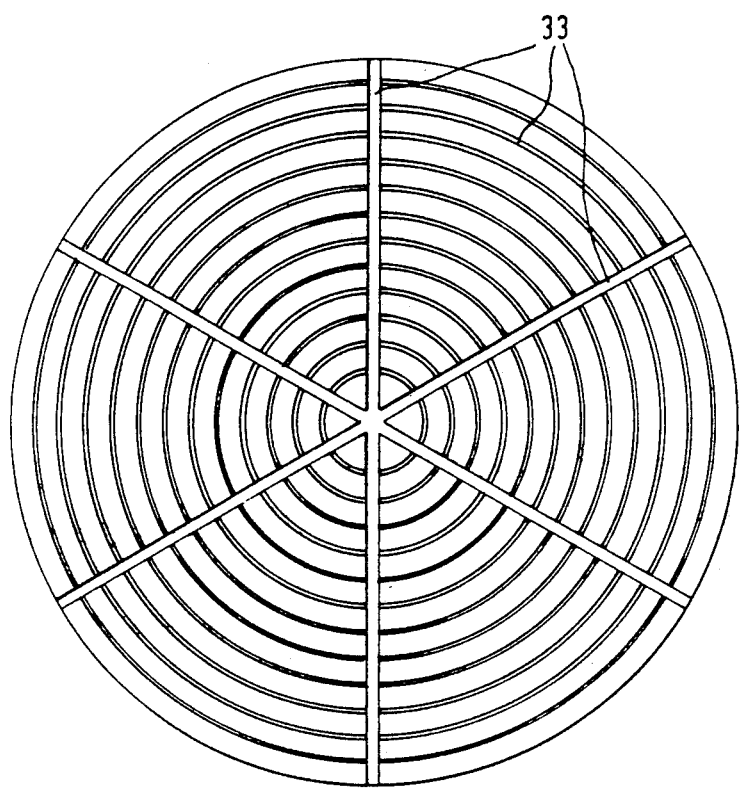
FIG. 2 is a bottom view of the contact surface of the heating heads.

The contact surface 32 facing towards the cover 5 and belonging to the heating head is curved or convex and provided with grooves 33. As may be seen from FIG. 2, the grooves 33 are concentric and diagonal or transverse thereto.

The apparatus functions as follows:

During the operation of the filling and sealing machine the containers 3, as already indicated in the foregoing, are conveyed through the individual working stations of the machine, in the direction shown by the arrow 2, by means of the conveying device 1. Behind the hot sealing station in which the covers 5 have been sealed on the containers 3, these latter move into position underneath the monitoring device 6. In this process the entire adjusting unit is controlled by a cam plate not shown in the drawing and subjected to the action of a drive, likewise not shown, so that it moves downwards and the heating head or heads 8 position themselves on the covers 5 of the containers 3. The spring 22 prevents them from oscillating as a result of their impact thereon. To assist the pressure required in mounting them thereon the pneumatic cylinder-piston unit 19 is moved out so that the contact pressure is increased. In this process the heat transference from the heating heads 8 is accelerated for the heating of the air or gas cushion present between the covers 5 and the material with which the containers are filled, the air or gases being at the same time forced through any apertures present in the cover 5. This process lasts about 0.3-0.4 seconds. After the expiry of this period, the pneumatic cylinder-piston unit 19 is once again retracted and the heating head 8 now rests on the cover 5 under its own weight plus the force of the spring 22.

If the cover 5 or the vessel has an opening, the air or gas expanded in volume by the aforementioned heating effect will escape. The result is that the heating head 8 remains in the same position in the vertical direction.

If, however, the container 3 or cover 5 is "gas tight", then the entire heating head 8 is raised by the expanded air or gas, by the ascending cover, resulting in a height difference of about 0.5-1 mm. In this process, the intrinsic weight of the heating head and the pressure of the spring 22 are overcome.

This axial adjustment of the heating head 8 is transmitted via the guide bar 11 to the plate 24, which interacts with the scanning device 25. The optical scanning system contained therein is capable of accurately determining height differences and thus of distinguishing faultless and defective containers or covers.

Thanks to the construction of the channel 33 in the contact surface 32 of the heating head any narrow apertures or cracks present will not be covered over or sealed off by the contact surface. Even these very narrow gaps in the cover or container will thus be detected.

In order to ensure that the measuring operation will be stable and reliable even under the rough conditions prevailing in a filling and sealing machine, the vertical spacer rod 27 to which the scanning device 25 is affixed provides a means of always starting from the same point, even if the compartment 4 is bent.

As the monitoring device immediately follows a hot sealing station, the residual heat remaining in the vessel is utilized as well.

It is nevertheless perfectly possible to mount the monitoring device in some other position. The operation of heating up the air or gases will then nevertheless take somewhat longer.

As the measuring system is very resistant, the monitoring device can also be of transportable construction, i.e. operate effectively with vessels accompanying its movement.

The result of the test by the optical fiber system can be evaluated in an electronic evaluation system. It is thus a simple matter to spray a code onto the edge of the vessel, for example, or punch an easily visible hole in a defective vessel with a needle, so that this vessel or the carton containing it can be removed over a side way.

Figure 3:
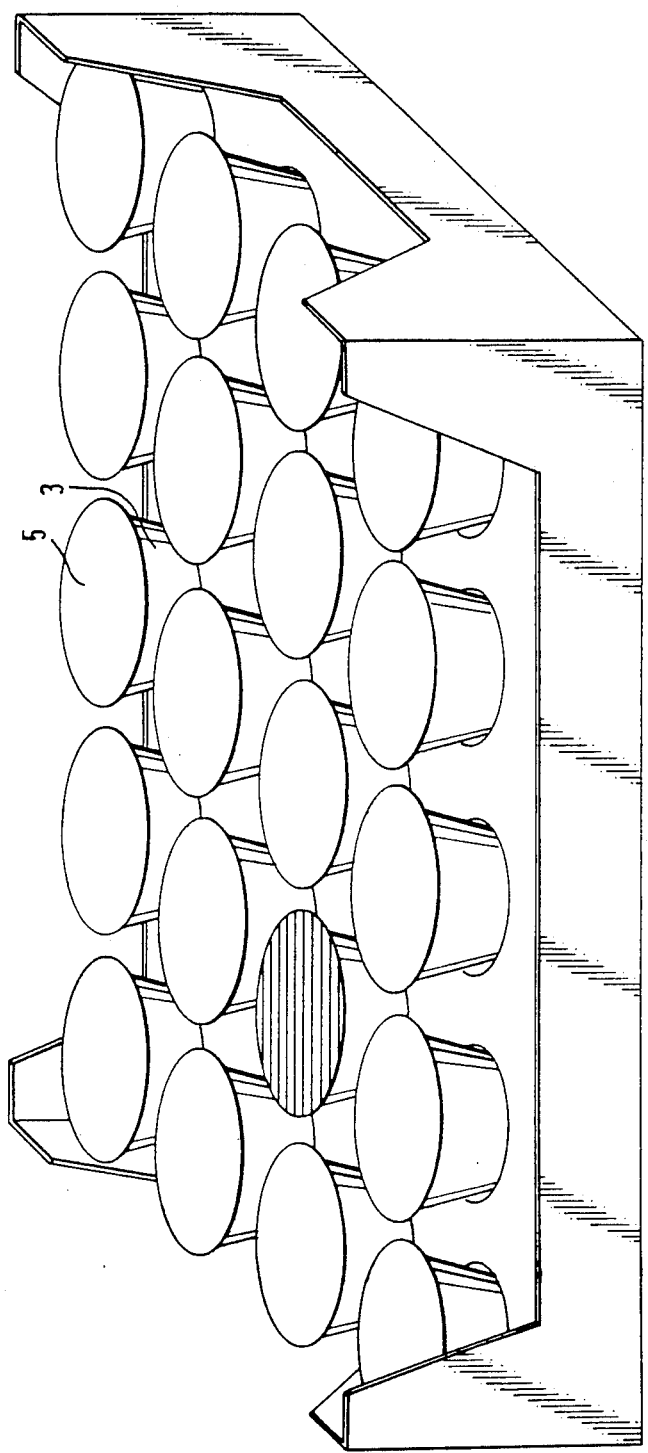
FIG. 3 is a schematic diagram of a carton containing filled vessels, one of which is defective.

The information from the tests can nevertheless also be fed into a PC control system. The exact position of a defective vessel is then transmitted via a slide register. The vessels are placed in cartons, and the carton containing a defective vessel will be removed over a side way and placed on a correcting belt. This correcting belt bears a stop device with a "committer", so that a picture with the issue of the faulty vessel, e.g. inversely flashing, can be emitted by a call-in process, as shown schematically in FIG. 3.

While there has been described a particular embodiment of the invention, it will be apparent to those skilled in the art that variations may be make thereto without departing from the spirit of the invention, and the scope of the appended claims:

We claim:

1. A process for monitoring the hermeticity of material filled containers which have an air or gas cushion present between the material and the sealed-on or welded-on covers comprising,
   heating the air or gas cushion present between the cover and the material in the container via the cover,
   pressing the cover by temporary mechanical impact into a lower initial position,
   scanning the change in position of the cover, which changes as a result of an increase in volume of the heated air or gas cushion, and then
   removing the containers which have been scanned and determined to have missing or faulty covers.

2. Apparatus for monitoring the hermeticity of material filled containers which have an air or gas cushion present between the material and the sealed-on or welded-on covers comprising,
   an adjusting unit in connection with
   a heating device, which is adjacent to
   a scanning device having
   a measuring indicator attached thereto, said heating device for each container or cover having
   a ram-like heating head, having
   a contact surface capable of being placed on the cover, said heating head being mounted in
   guide bushings in such a way as to be axially movable in opposition to at least
   one pressure spring.

3. Apparatus as described in claim 2, wherein the contact surface, belonging to the heating head, is arched or convex.

4. Apparatus as described in claim 3 wherein the contact surface of the heating head being provided with grooves.

5. Apparatus as described in claim 4, wherein the grooves being shaped
   concentrically, diagonally or transversally thereto.

6. Apparatus as described in claim 5, wherein the pressure spring acting on the heating head rests at one end on
   a clamping piece which is secured on
   a guide bar of the heating head, and at the other end on
   a pressure plate adjustable relatively to holding plates which accommodate said guide bushings.

7. Apparatus as described in claim 6, wherein the pressure plate is connected with
   at least one pneumatic cylinder-piston unit which is connected via one or more
   adjusting bars with
   a frame bearing the holding plates.

8. Apparatus as described in claim 7, wherein the scanning device is provided with
   an optical measuring device interacting with
   a plate secured to the guide bar of the heating head.

9. Apparatus as described in claim 8, wherein the measuring device is affixed to
   an adjustable vertical spacer rod displaceably mounted in bushings situated in said holding plates.

10. Apparatus as described in claim 9, wherein the hermeticity monitoring device is positioned immediately behind
    a sealing or welding station of a container filling and sealing machine.

* * * * *